United States Patent [19]
Iyer et al.

[11] Patent Number: 5,345,585
[45] Date of Patent: Sep. 6, 1994

[54] METHOD FOR OPTIMIZING PROCESSING OF JOIN QUERIES BY DETERMINING OPTIMAL PROCESSING ORDER AND ASSIGNING OPTIMAL JOIN METHODS TO EACH OF THE JOIN OPERATIONS

[75] Inventors: Balakrishna R. Iyer, Mt. View; Arun N. Swami, San Jose, both of Calif.

[73] Assignee: International Business Machines Corporation, Armonk, N.Y.

[21] Appl. No.: 801,306

[22] Filed: Dec. 2, 1991

[51] Int. Cl.$^5$ ................... G06F 15/40; G06F 15/419
[52] U.S. Cl. .................. 395/600; 364/974.4; 364/974.6; 364/DIG. 2
[58] Field of Search ................. 395/600, 650

[56] References Cited
U.S. PATENT DOCUMENTS

| | | | |
|---|---|---|---|
| 4,829,427 | 5/1989 | Green | 364/300 |
| 4,956,774 | 9/1990 | Shibamiya et al. | 364/200 |
| 5,091,852 | 2/1992 | Tsuchida et al. | 395/600 |
| 5,121,494 | 6/1992 | Dias et al. | 395/600 |

OTHER PUBLICATIONS

"Access Path Selection in a Relational Database Management System", P. Selinger, et al. ACM Sigmod Intn'l Conference, 1979, pp. 23–34.

"On Optimal Nesting for Computing N-Relational Joins", T. Ibaraki & T. Kameda, ACM Transaction on Database Systems, 9(3):482–502, Oct. 1984.

"Optimization of Nonrecursive Queries", Boral, et al., 12th Intn'l Conference on Very Large Data Bases, pp. 128–137, Kyoto, Japan, 1986.

"Randomized Algorithms for Optimizing Large Join Queries", Y. E. Ioannidis & Y. Kang, ACM Sigmod Intn'l Conference for Management of Data, 1990, pp. 312–321.

Yu, Philip S., "Optimal Buffer Allocation In A Multi-Query Environment", 1991, *Proceedings, Seventh International Conference On Data Engineering* Conf. Date Aug. 8–12 Apr. 1991 IEEE Comput. Soc. Press pp. 622–631.

*Primary Examiner*—Thomas C. Lee
*Assistant Examiner*—Jack Choules
*Attorney, Agent, or Firm*—Esther E. Klein; Prentiss W. Johnson

[57] ABSTRACT

A join optimization method is provided for use with a data processor for optimizing the processing of a query for retrieval of data from a relational computer database. The database is organized by relations and data is retrieved by preforming join operations on the relations. The join operations are optimized by randomly selecting an initial order for the join operations, assigning optimal join methods based on the initial order, finding an optimal order based on the assigned methods and repeating a polynomial number of times. The Krishanmurthy, Boral and Zaniolo (KBZ) Algorithm is used to determine a join optimization sequence and further refinement is provided by determining costs for alternate join order sequences using alternate join methods.

15 Claims, 6 Drawing Sheets

METHOD FOR OPTIMIZING PROCESSING OF JOIN QUERIES BY DETERMINING OPTIMAL PROCESSING ORDER AND ASSIGNING OPTIMAL JOIN METHODS TO EACH OF THE JOIN OPERATIONS

TECHNICAL FIELD

The present invention is directed toward database management systems for use with data processors, and more particularly toward optimizing the computer-implemented process of retrieving data from databases.

BACKGROUND ART

Enterprises typically store large amounts of data in computer database systems using database management system (DBMS) software to access the data. A relational database management system (RDBMS) logically organizes the data into relations. A relation can be thought of as a table where each row is a tuple and each column is a component of the relation designating an attribute.

Data can be extracted by querying the database for all tuples in a relation that meet a certain criteria. A join operation is performed to connect data from two or more relations wherein tuples with matching attributes are joined to form a new tuple. A join order is the order in which join operations are performed. A join method is a technique for performing the join of two relations.

A query language provides a set of commands for storing, retrieving and deleting data. The query languages for relational database management systems do not require users to specify the manner in which data needs to be accessed. Rather, query optimization algorithms in the database management systems select the manner in which queries will be processed.

For large databases, the manner used by a database management system to process a query has to provide access to data in a reasonable period of time in order to accommodate database users needing data to be retrievable without excessive delay.

There are three problems solved concurrently by a query optimizer in a relational database system when processing a query for retrieving data. The first problem is the selection of the access method to access each table specified in the query. This problem can be solved in linear time as a function of the number of relations in the query since the access method selection only involves examination of each available access method for each table.

The other two problems to be solved by the query optimizer are the selection of the order in which to join relations or tables in the query, the join order, and the selection of the method to be used for each join operation joining relations. A join plan comprises a join order scheme for joining the relations and a join method scheme of join methods to be used for each join operation. The solutions for these two problems, i.e., providing a good join plan, are complicated and require polynomial time solutions.

There are two practical procedures for selecting optional join orders and methods that are currently used in relational database software products and there are other solutions that have been proposed in the literature. However, all of the known procedures have shortcomings of not finding a good join plan or requiring too much programming time and too much space or memory.

The "Dynamic Programing Algorithm" is currently used in many RDBMS products and is described in P. G. Selinger, M. M. Astrahan, D. D. Chamberlin, R. A. Lorie and T. G. Price, "Access Path Selection in a Relational Database Management System", in *Proceedings of the ACM-SIGMOD International Conference on Management of Data*, 1979, at pages 23–34. The Dynamic Programming Algorithm uses the iterative construction of a search tree to join R relations. First, the best way is found to join every pair of relations that is linked by a join predicate. Next, the best way to join composites of three relations is found by considering for each relation the best way to join it with each pair of relations joined as saved earlier in storage. This process continues for the composites of four relations and so on. Finally, a plan to join the R relations is found which can be implemented in a minimal amount of time. At each stage, the best plans are saved for every interesting order. An interesting order is the order defined by any join column.

The Dynamic Programming Algorithm is very complex in terms of memory and time. The number of solutions that must be stored for the worst case is $O(N2^R)$, where N is the number of interesting orders. The worst case time complexity has the same order. For any particular query, the complexity depends on the connectivity of the query graph.

Experiments have shown that the time and memory used by the Dynamic Programming Algorithm are unacceptable for queries involving large numbers of tables, especially on processors with small memories. Database users generally prefer to pose larger join queries than permitted in current database systems that are constrained by the limitations of the Dynamic Programming Algorithm. Therefore, while dynamic programming tends to be accurate in producing optimal join order and method selections, the time and memory constraints create a problem for most users. The cost of a given plan is based on the amount of time required to process a given query using a join plan. For some queries that will be performed hundreds of times, it is worthwhile to use the Dynamic Programming Algorithm to obtain a join plan that can be performed quickly. However, for other queries, it is not worth the time of using such an expensive algorithm.

The excessive time and space complexity of the Dynamic Programming Algorithm has motivated the development of algorithms that have polynomial time and memory complexity while still producing good join orders. One example of a polynomial time algorithm is the Greedy Algorithm.

The Greedy Algorithm is well-known to those skilled in the art. The algorithm uses every pair of relations in the query, even if there is no join predicate connecting them, to find the pair of relations that can be joined the quickest. There are $O(R^2)$ pairs to be considered, where R is the number of relations in the query. Next, the algorithm looks for the next join that can be performed the quickest. This process continues until all the relations have been joined. The time complexity for the algorithm is bounded by $O(R^2)$. The memory space required for the Greedy Algorithm is only that which is needed to store the query and its corresponding plan. Therefore, the Greedy Algorithm does not have the shortfalls of the Dynamic Programming Algorithm in terms of time and memory complexity. However, the Greedy Algorithm does not produce join plans that can be implemented as fast as the plans produced by the Dynamic Programming Algorithm.

Relational database query optimization systems have traditionally relied on the use of dynamic programming or a simple Greedy Algorithm for selecting join orders for executing queries. However, neither optimization process produces the plans that can be executed fast using reasonable amounts of time and memory. Dynamic Programming yields good solutions but has time and memory complexities that are exponential in the number of relations appearing in a query, becoming impractical when large numbers of relations are involved in the query. Conversely, the Greedy Algorithm is simple and fast to execute, but the quality of the solution for join orders and methods generated by the Greedy Algorithm is far less optimal than what is provided by the Dynamic Programming Algorithm.

Another query optimization algorithm was proposed by Ibaraki and Kameda which binds the optimal join order in polynomial time under some restrictive assumptions; T. Ibaraki and T. Kameda, "Optimal Nesting for Computing N-relational Joins", *ACM Transactions on Database Systems*, 9(3):482-502, October 1984. Krishanmurthy, Boral and Zaniolo developed an algorithm which improved the time complexity of the Ibaraki and Kameda algorithm which is described in R. Krishanmurthy, H. Boral and C. Zaniolo, "Optimization of Nonrecursive Queries", *Proceedings of the Twelfth International Conference on Very Large Data Bases*, pages 128-137, Kyoto, Japan, 1986. This algorithm is known as the KBZ Algorithm. The algorithm is stated in terms of a rooted join tree. The root is the first relation in the join sequence. By considering every relation in the join as the root and picking the best solution among the R choices, the problem is reduced to a problem of finding the best join order for a rooted join tree.

The KBZ Algorithm provides a join order optimization algorithm in polynomial time. However, the KBZ Algorithm includes restrictive assumptions and does not provide the join plans that are as good as the plans produced by the Dynamic Programming Algorithm.

The KBZ Algorithm has a restriction that the cost equations used to determine the effectiveness of the join methods must be of a particular multiplicative form. Specifically, according to the KBZ Algorithm, the cost of joining two tables $R_1$ and $R_2$, where $R_1$ is the outer relation, must be of the form $C(R_1) + \|R_1\| C(R_2)$ where the cardinality of relation R, $\|R\|$, is taken after applying selection predicates. For $R_1$, the outer relation, $C(R_1)$ is the cost of obtaining relation $R_1$. For $R_2$, the inner relation, $C(R_2)$ is the cost of joining relation $R_2$ with each tuple of the outer relation $R_1$. $C(R_2)$ takes into account a join predicate filter factor. The cost equations for the nested loops join method must satisfy this required multiplicative form.

Another restriction of the KBZ Algorithm is that interesting orders are considered not to exist. Interesting orders affect join orders. The best join order could be changed if the join column of one relation is exactly the clustering column of that relation. C(R), the time cost of joining a relation, changes if the sort order on relation R is exploited by the outer relation. For example, a nested loop join performed through a clustered index has a value for C(R) that is lower than the C(R) value for a nested loop join through a nonclustered index. The KBZ Algorithm requires C(R) to be independent of join order, and hence ignores interesting orders.

The KBZ Algorithm is also restrictive in that it assigns a rank function to each relation. Rank is defined as $(\|R\|-1)/C(R)$. The cardinality of R, $\|R\|$, has a multiplicative relationship with the number of tuples in the result of joins of relation R. C(R) relates to the cost of performing a join with relation R. KBZ requires that the relations with the smallest ranks be joined first. However intuitively, the joins with relations with larger cardinalities should be joined later because these require carrying a large number of tuples in the intermediate join results. Also, intuitively the relations with large C(R) should be joined when the number of rows in the composite is small rather than when it is large. Usually this is during the initial portion of the join order. However, KBZ requires joins involving relations with large $\|R\|$ and/or small C(R) which have a large rank be postponed.

The foregoing restrictions limit the ability of the KBZ Algorithm to find optimal plan results within non-complex time and space constraints. The space complexity of the KBZ Algorithm is O(R) and the time complexity is $O(R^2)$. However, the quality of the solutions obtained by KBZ is not at the level of the dynamic programming.

An experiment was conducted using 100 random generated join queries containing R relations, for R ranging from 2 to 19. The queries were generated by varying various query parameters such as relation cardinalities, indexes on columns, clustering columns, shapes of drawing graphs and drawing selectivities. The time cost of each join order plan produced by KBZ was compared to plans produced by the Greedy Algorithm and the Dynamic Programming Algorithm. The cost ratio is defined as the ratio of the cost of the plan produced by an algorithm to the cost of the plan produced for the same query by the Dynamic Programming Algorithm.

For the Greedy Algorithm, two-thirds of the plans that were produced had time costs that were more than 20% of the plans produced by the same respective queries by the Dynamic Programming Algorithm, half of the plans cost more than twice that of dynamic programming, 22% were more expensive by at least one order of magnitude, and 3% were more expensive by at least two orders of magnitude. The average cost of the join order generated by the Greedy Algorithm was 37 times higher than the Dynamic Programming Algorithm solution cost. The quality of solutions provided by the KBZ Algorithm was comparable to those produced by the Greedy Algorithm.

Therefore, while KBZ improves on the Greedy Algorithm in terms of producing more optimal results and improves on the dynamic programming in terms of having smaller space and time complexity requirements, KBZ does not provide good solutions with a minimal space/time complexity.

A number of optimization algorithms have been proposed that use randomization, such as the Iterative Improvement and Simulated Annealing algorithms. However, these algorithms do not provide optimal join processing with non-complex time and memory requirements.

The randomization algorithms use transformations of join orders. An example of such a transformation is interchanging the position of two relations in one join order to get a new join order. The two join orders can be analyzed to determine if the transformation is profitable.

In the Iterative Improvement method, a large number of initial join orders are tried. For each initial order, the following procedure is performed. For any join order, a large number of transformations are attempted until some maximum number of transformations have been tried, or a transformation is found that leads to a better join order. If a better join order is not found, the next randomly generated initial order is used. At all times, the best join order encountered is stored.

Simulated Annealing is similar to Iterative Improvement except that transformations that lead to a higher cost join order are accepted with a certain probability. The probability threshold is decreased during the optimization process. The Simulated Annealing method only calls for a single run starting from an initial join order.

A hybrid of the Iterative Improvement method and Simulated Annealing method was proposed by Y. E. Ioannidis and Y. Kang in "Randomized Algorithms for Optimizing Large Join Queries", in *Proceedings of ACM-SIGMOD International Conference on Management of Data*, pages 312-321, 1990. In the hybrid algorithm, Iterative Improvement is performed using a small number of initial join orders. Simulated Annealing is performed starting with the best order found by Iterative Improvement.

Experimental results have shown that given enough time, Simulated Annealing obtains solutions comparable to those obtained by Iterative Improvement. However, the Iterative Improvement ordering plan was never better than the KBZ Algorithm ordering plan by more than 50% on the average. These randomized algorithms do not provide results that are equal to the optimization provided by the Dynamic Programing Algorithm without the space and time complexity. Therefore, the Simulated Annealing algorithm does not overcome the problem of providing the dynamic programming optimization results for join processing with polynomial space/time complexity.

SUMMARY OF THE INVENTION

A relational database computer system including a data processor, a stored database, and a plurality of database relations wherein the relations are retrievable by the processor by means of query commands performing a plurality of join operations on the relations. In one aspect of the invention, an optimization method is provided for optimizing the processing of the join operations.

A join method is randomly assigned to each of the join operations to produce a current join method assignment scheme. A subset of the join operations is selected to provide a maximum acyclic grouping of the join operations. The KBZ Algorithm is used on the maximum acyclic grouping to produce a KBZ ordered sequence of join operations. The KBZ ordered sequence of join operations is arranged into a current join order scheme using a join order optimization process.

For each of the join operations, a join method is selected using a cost optimization join method process. The KBZ Algorithm is then used on the current join order scheme using the current join method assignment scheme. The processes of running the KBZ Algorithm on the current join order scheme and then further optimizing join orders and methods are repeated until there is no decrease in the cost value for the resulting join operation sequence. The whole process starting from the selection of random join methods is repeated a plurality of times to produce a set of current join order schemes and join method assignment schemes. The join plan (join order scheme and associated join method assignment scheme) having the minimal cost is the optimal solution plan.

In one embodiment of the invention, the optimization join order process comprises scanning the relations in the current join order scheme from last to first, swapping relations to produce a candidate join order and then comparing the cost of the candidate join order with the cost of the current join order scheme before the relations were swapped to identify a lower cost join order sequence. This is performed in a time complexity of $O(R^2)$. During this scan, the join methods are not changed. After the scan, another scan is performed to change the join methods during the join method optimization process.

In one embodiment of the invention, the cost optimization join method process comprises substituting join methods used for joining each of the relations and determining whether the substituted method provides a lower cost for the join operations given the current join order scheme.

In one embodiment of the invention, a relatively inexpensive postprocessing step is used for identifying a better join order. The post processing step is similar to the order changes called for in the join order optimization process.

In one embodiment of the invention, a randomization scheme is provided for repeating the entire algorithm for a set of randomly selected starting points where each starting point is a random assignment of join methods. This avoids obtaining only a local minimum value due to local optimization.

One embodiment of the invention exploits the KBZ Algorithm while relaxing its restrictive assumptions. For example, the KBZ Algorithm is designed only for use with one type of join method, the nested loops join method, even though other join methods such as the sort/merge join method and nested loops join method are both currently used in many products. The present optimization method calls for extending the KBZ Algorithm to be used on both of these join methods and for extending KBZ for other methods which may be developed in the future.

Another significant restriction of the KBZ Algorithm is that it can only optimize acyclic join graphs. The present invention changes the spanning tree input to the KBZ Algorithm to correspond to the join order determined. The use of spanning trees in this fashion allows the handling of cyclic join graphs.

A key feature of this join optimization method is that its time complexity is polynomial in terms of the number of relations in the query and not exponential.

Another key feature of this optimization method is the separation of the choice of the join method and join order into different parts of the algorithm. This is a significant departure from the optimization methods previously developed. For example, the Dynamic Programing Algorithm considers the best choice of join order and method at the same time. When finding all possible ways to join two queries, it considers each possible pair in each possible join method and repeats the above for each possible interesting order. Then for every possible triple it finds the best order and method.

The invention exploits the fact that the choice of join method may depend on the join order. The original join method is chosen arbitrarily and the KBZ Algorithm is used for rearranging these join methods into a more optimally ordered sequence having a lower cost. Later, this join order is used as a basis for determining the join methods to be used in this join order. Afterward, the optimal join ordering is run through the KBZ Algorithm to find the best order for the new assignment of methods. Each step results in a join plan (an ordered sequence of join operations with join methods) that has the same or lower cost than the plan obtained in the preceding step. When there are no further improvements, the process is stopped. The algorithm may also continue until a maximum iterations number is reached which is $R^2$, where R is the number of relations. This maintains that the algorithm performs in polynomial time.

BRIEF DESCRIPTION OF THE DRAWINGS

FIG. 5 is a schematic diagram of relations being swapped;

FIG. 6 is a schematic diagram of pairs of relations being swapped; and

FIG. 7 is a schematic diagram of a relation being moved.

DESCRIPTION OF THE PREFERRED EMBODIMENT

Figure 1:
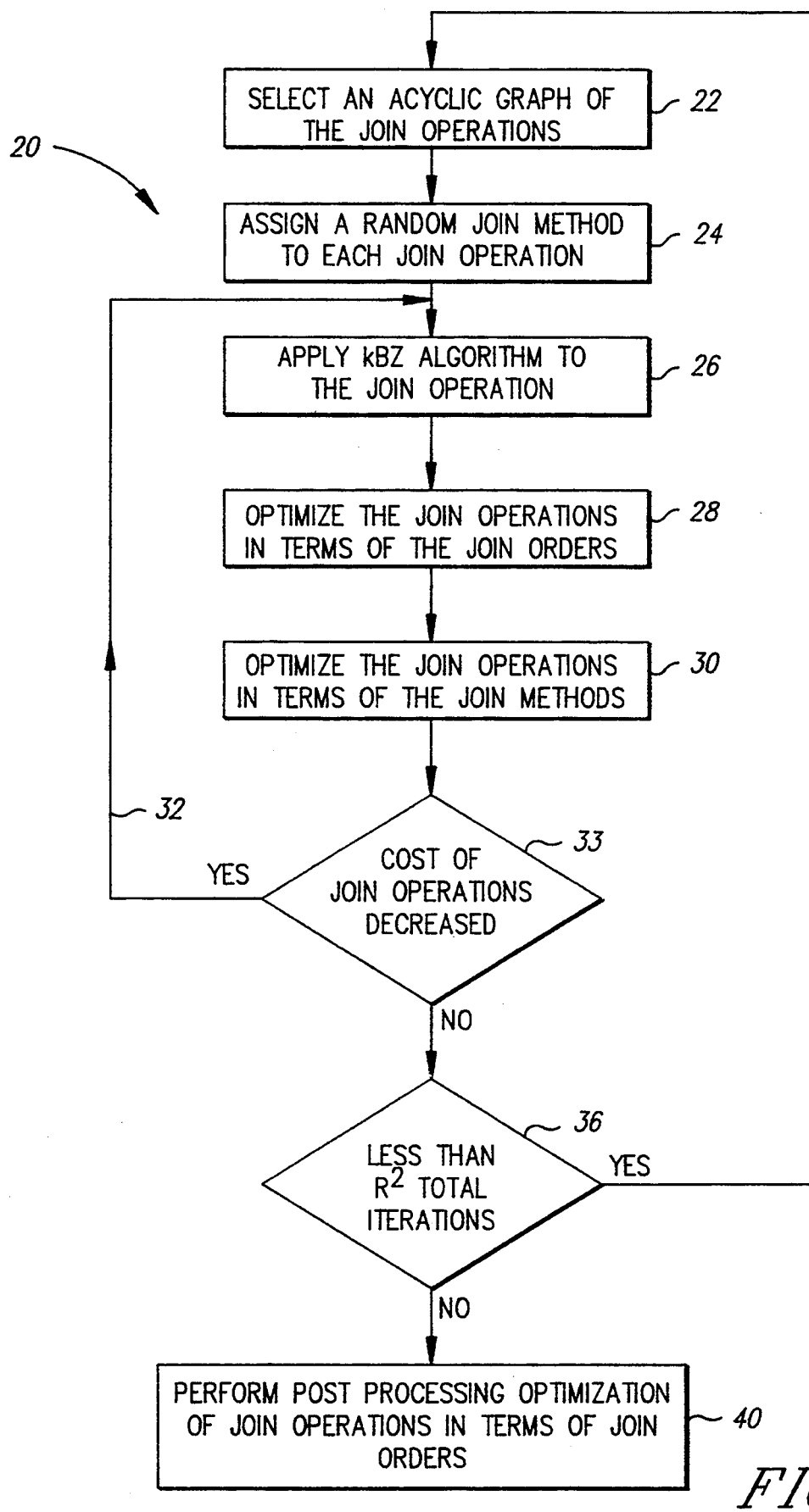
FIG. 1 is a flowchart of an embodiment of the present invention.

Referring to FIG. 1, a flow chart 20 illustrates a preferred embodiment of the invention for optimizing the processing of a plurality of join operations to join relations of a database in conjunction with computer processing a database query. The method for optimizing the join operation comprises identifying good join orders for the join operations and identifying good join methods to be used for implementing each of the join operations.

A join method is a technique for performing the join of two relations. A join method scheme is a set of join methods to be used on a plurality of join operations. A join order scheme is an order in which join operations are performed. A join plan is a join order scheme with an associated join method scheme. A cost of a join plan is based on the time required to perform the join operations using the join plan. That is, a low cost join plan can be performed in a relatively short period of time. A good join plan enables a query to be processed and data retrieved in an efficient manner so as not to require excessive processing time.

A preferred embodiment of the invention uses the KBZ Algorithm to select a join order for the join operations which is then used as a basis for obtaining a join plan comprising an optimal join order and an optimal join method for each join operation. The KBZ Algorithm provides a join order optimization algorithm in polynomial time. The algorithm views the join operations as a rooted join tree. The root is the first relation in the sequence of R joins. Each relation in the join operation sequence is considered as the root. The best solution is chosen from amongst the R relations. The algorithm tries to find the best join order for the rooted join tree based on values for a cost relation. The KBZ Algorithm was designed only to work on acyclic graphs so as to have a rooted join tree. The plurality of join operations can be expressed as a graph which may be cyclic. Therefore, an acyclic tree is selected from the cyclic graph 22.

Any join order maps to a single spanning tree where the edges correspond to the join predicates in the join order. A join order that enables optimal processing of a query has a corresponding spanning tree that will likewise produce good results.

The acyclic tree can be chosen using a number of methods. A preferred method is to run a greedy algorithm to choose join orders and join predicates which comprise the spanning tree. Alternatively, a heuristic can be used based on the smallest joining selectivity which is estimated by the cost model.

Next, each join operation is randomly assigned a join method 24. The pseudocode for providing the random join methods is as follows:

```
randomize_join_methods( ) {
    for (each edge in join graph) {
        assign join method at random;
    }
}
```

There are currently two join methods known to those skilled in the art, the sort/merge join method and the nested loop join method. The KBZ Algorithm is designed only for determining join orders for joins that use the nested loop join method. The KBZ Algorithm has been expanded to select join orders for joins that will use the other known join methods and may also be expanded for join methods that are developed in the future.

The standard KBZ Algorithm uses cost formulas set up specifically for the nested loop join method. The cost formulas for the nested loop join method satisfy the KBZ multiplicative cost formula criterion. The cost of the sort/merge join method can be approximated by a cost function of two parts: one part satisfies the KBZ cost criterion and the other part is independent of join order and hence may be factored out of the cost when optimizing for the best join order. This is true so long as interesting orders are ignored.

The KBZ Algorithm produces a join order for the acyclic tree based on the randomly assigned join methods 26. The output from the KBZ Algorithm is an ordered sequence of join operations wherein each join operation still has the join method that was randomly assigned.

The join order provided by the KBZ Algorithm is systematically rearranged to identify a more optimal (lower cost) join order for the join operations given the current assignment of join methods 28. The resulting join ordered scheme is then used by a join method optimization process to identify join methods to be used for each of the join operations which produces a lower cost join plan 30. That is, the join method optimization process attempts to find a join method for each join operation that provides the lowest cost for the sequence of join operations given the join order scheme that had been determined.

The cost for a sequence of join operation can be determined using a number of available cost formulas that are well known to those skilled in the art. The cost of a sequence of join operations is based on time savings that are obtained when a plurality of join orders using given join methods are joined in a particular order. For example, one criterion for cost determinations can be the size of the resulting relations of joins, wherein it would be desirable to perform joins that result in smaller tables earlier than joins that result in larger tables later. Therefore, joins involving larger numbers of tuples are more desirably performed later.

There are many factors which effect the cost determination for a given ordered join operations sequence. The specific cost formula used to make the ordering optimization sequence is not important for this join optimization method and is not part of this invention.

The cost of the current join order scheme is compared to the cost determination for the join operations prior to the KBZ Algorithm being performed and the other optimization processes being performed. As long as there is a decrease in the cost for the current join order scheme using the current join method scheme, the foregoing processes are repeated at step 32 by applying the KBZ Algorithm on the current join order scheme 26 and then further optimizing the join order scheme 28 and join method scheme 30. A further limitation is provided that these steps 26, 28 and 30, will not be repeated more than R * R times, as shown at step 33, where R is the number of relations in the join sequence.

The optimal join order is determined independently of the join methods that are to be used and vice versa. This process is an improvement over the Dynamic Programming Algorithm where the best choice for join order and methods are chosen at the same time. In the embodiment of the method provided herein, the optimal join methods and join orders are identified separately. The optimal join order is selected based on a given selection of join methods. Thereafter, given a join order, the optimal join methods are selected.

In the preferred embodiment of the optimization process, a randomization scheme is provided at step 36 for repeating the foregoing process for a set of randomly picked starting points, where each starting point is a random assignment of join methods. This avoids obtaining only a local minimum value due to local optimization. The process, including steps 26, 28 and 30, is repeated at most R * R times, so as to maintain a polynomial time process.

It is an important feature that the method can be performed in polynomial time. A non-polynomial process becomes excessively time consuming when there are a lot of relations to be joined. A database user needs to be able to retrieve data that is to be accessed by a query in a reasonable time frame. Non-polynomial time algorithms such as the Dynamic Programing Algorithm, require an excessive amount of time to optimize the join operations.

In the preferred embodiment, a postprocessing step 40 tries to identify a more optimal join order.

The pseudocode for the preferred embodiment is provided below:

```
AB_algorithm(int max_iterations) {
  no_of_iterations = 0;
  best_soln_cost = MAXDOUBLE;
  while (no_of_iterations <= max_iterations) {
    randomize_join_methods( );
    no_of_iterations = no_of_iterations + 1;
    prev_cost = MAXDOUBLE;
    change = TRUE;
    while (changed && (no_of_iterations <= max_iterations)) {
      change = FALSE;
      apply_KBZ( );
      new_cost = change_order_and_methods( );
      if (new_cost < prev_cost) {
        prev_cost = new_cost;
        no_of_iterations = no_of_iterations + 1;
        change = TRUE;
      }
    }
    if (prev_cost < best_soln_cost) {
      best_soln_cost = prev_cost;
    }
  }
  post_process( );
}
```

Figure 2:
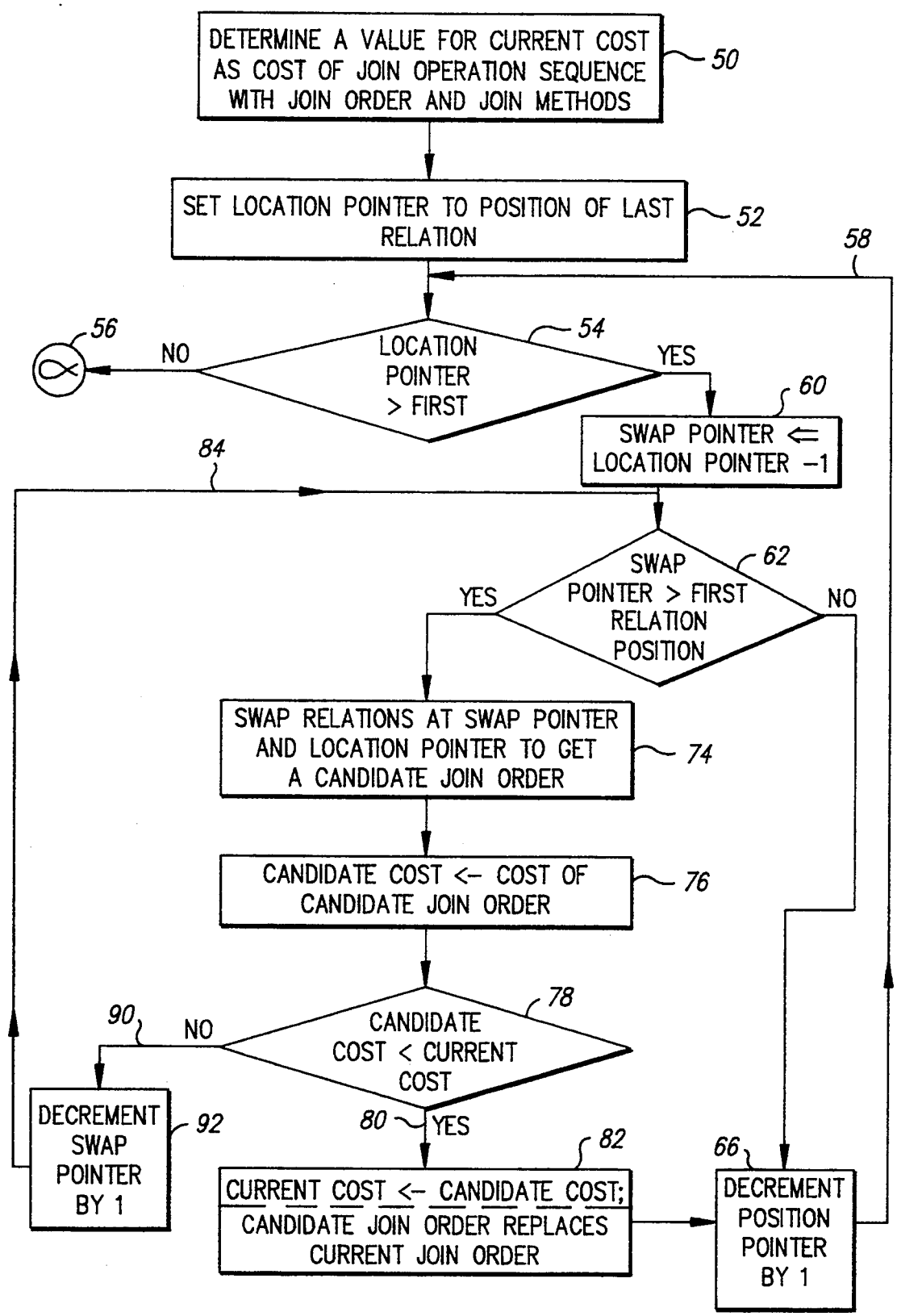
FIG. 2 is a flowchart of a process for selecting a join order.

FIG. 2 provides a more detailed illustration of a preferred embodiment for optimizing the join order scheme produced from the KBZ Algorithm by rearranging the join order scheme. First, a value of the current cost is determined at 50. As mentioned previously, there are many available algorithms for assessing the cost for a given configuration of join orders and methods. Any of several known cost algorithms can be used, and the determination of the cost is not part of the present invention.

A location pointer is set to point to the last relation in the sequence of relations to be joined as output from the KBZ Algorithm 52. If the location pointer points to the first relation in the sequence 54, then there are no relations that can be rearranged with the relation pointed to by the location pointer and this process ends 56. While the location pointer is still greater than the location of the first relation, a loop 58 is performed for rearranging relations.

Initially, a swap pointer is set to the position preceding the location pointer 60. If the location pointer was positioned at the first relation in the sequence 62, then there are no relations to rearrange with the relation at the location pointer. At that point, the location pointer is decremented 66. Otherwise, the relations at the location pointer and swap pointer are swapped to provide a candidate join order 74. The value of candidate cost is set to the value of the cost of the candidate join order 76. The current cost value is compared to the candidate cost value 78. If the candidate cost is less than the current cost 80, then the current cost is set to the value of the candidate cost and the candidate join order replaces the current join order 82. The location pointer is then decremented to the preceding position 66 and the loop for iteratively decrementing the swap pointer 84 ends and loop for iteratively decrementing the position pointer 58 continues. Otherwise, if the candidate cost is less than the current cost 90, then the swap pointer gets decremented a position 92 and the swap pointer loop 84 continues to rearrange join order to identify the assign a lower cost join order scheme.

Referring to FIG. 7, the swapping of relations is shown for a sequence of relations ABCDEFG 98. A location pointer 100 points to the relation G 102. The swap pointer 104 initially pointed to relation F 106 and continued to be decremented so as to point to relations preceding G in order to find an alternate candidate join order that had a lower cost than the current join order. When the relation D was swapped with relation G, a lower cost order was found and that candidate order became the current order ABCGEFD 108.

A heuristic used by this method is that when the cost of a candidate join order is lower than the current join order cost, the process does not continue to look for other relations to swap with the relation being pointed to by the location pointer. If one relation is considered good enough, then it is determined that sufficient work has been done.

The pseudocode for this portion of the method is provided below:

```
change_order_and_methods( ) {
    old_cost = cost of current join order and methods;
    for (pos = last; pos > first; pos = pos − 1) {
        for (pos_1 = post − 1; post_1 > first;
        pos_1 = pos_1 − 1) {
            swap relations at pos_1 and post;
            cur_cost = cost of new join order;
            if (cur_cost < old_cost) {
                old_cost = cur_cost;
                change current join order;
                break;
            }
        }
    }
    change spanning tree to correspond to new join order;
    for (pos = first; pos < last; post = pos + 1) {
        pick locally best join method;
    }
    return (cost of new join order and methods);
}
```

Figure 3:
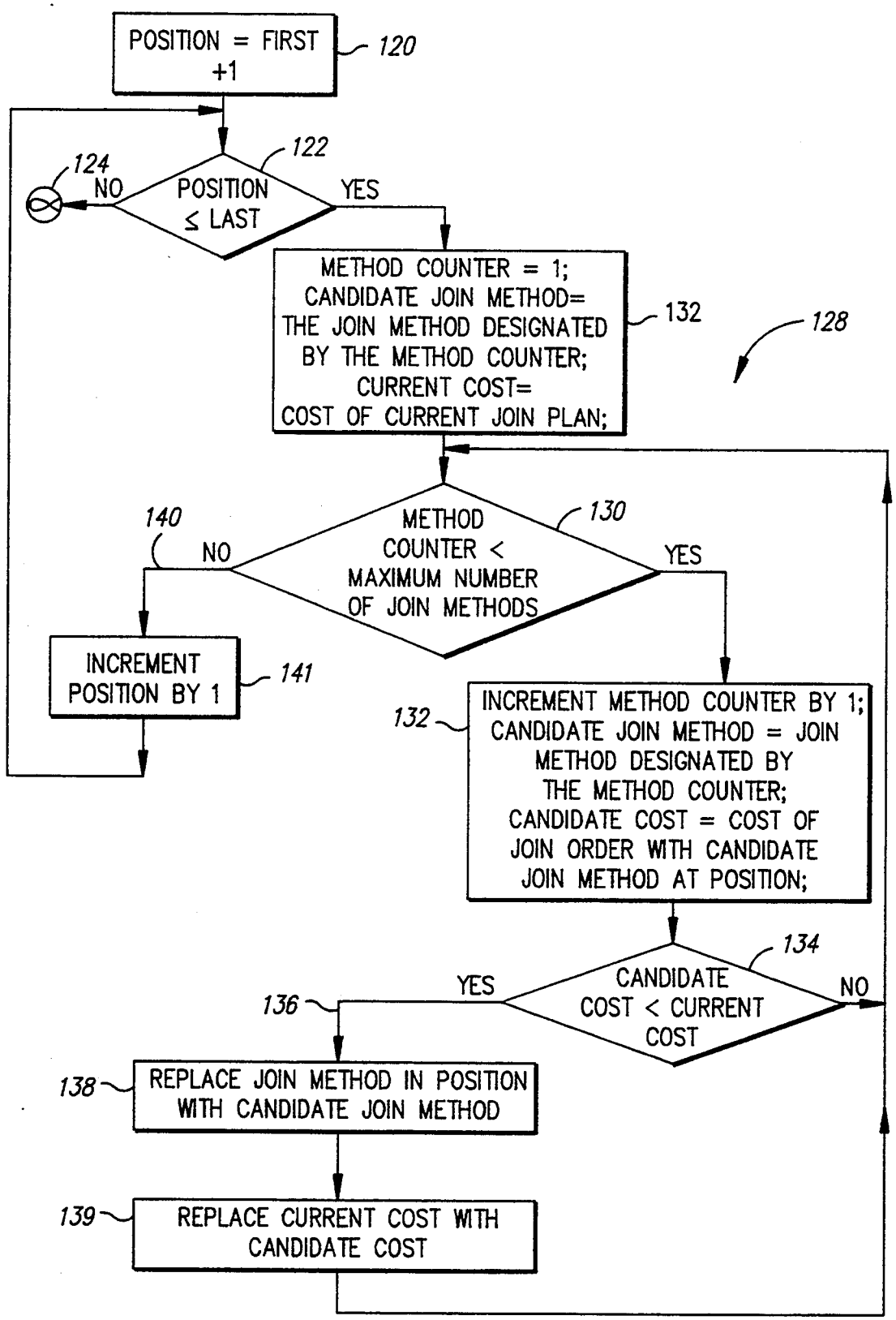
FIG. 3 is a flowchart of a process for selecting join methods.

Referring to FIG. 3, a more detailed explanation is provided for the preferred embodiment for choosing an optimal join method for each join operation in the sequence of join operations provided by the KBZ and join ordering processes.

A position pointer is set to the position following the position of the first relation in the sequence 120. If position pointer is pointing to the last relation 122, then this process is complete 124. Otherwise, a series of alternative join methods are substituted one at a time for the current join method used at the location of the position pointer and the cost for the resulting join plan is calculated to identify a lower cost join method scheme given the current join order scheme 128.

A join method counter is set to 1 and the candidate cost is set to the value of the cost of the sequence using the method designated by the method counter for the join operation designated by the position counter 132. The candidate cost is compared to the current cost 134. If the candidate cost is less than the current cost 136, the join method in the current join order at the location of the position pointer is replaced with the join method designated by the method counter 138. The current cost is also set to the candidate cost 139.

The process is repeated for the total number of join methods 130, where the join method counter is compared to the maximum number of join methods known to those skilled in the art. When all the join methods have been tried on a given join operation in the current join order 140, then the position counter is incremented one 141 and the process 128 is repeated for each relation in the sequence.

After the process identifies good join methods given the current join order scheme, the join plan produced from the join method and join order optimization processes is used as input for the KBZ Algorithm. These optimization processes are repeated until there is no improvement in the cost of the join order or the processes are repeated R*R iterations. The whole process, the first assignment of random join methods, optimization of current join plan by the KBZ Algorithm, and join order and method optimizations of the current join plan are repeated up to a total of $R^2$ times, where R is the number of relations in the sequence of operations and the counter for R is incremented for each inner loop. So that, if there is improvement for $R^2$ times, no further repetition is performed.

In the preferred embodiment, a postprocessing step 40 is included to ensure that the optimal solution is obtained. The pseudocode for this process is provided below.

```
post_process( ) {
    old_cost = cost of current join order and methods;
    for (pos = last; pos > first; post = pos − 1) {
        for (pos_1 = pos − 1; pos_1 > first;
        pos_1 = pos_1 − 1) {
            swap pairs of relations at pos_1 and pos;
            cur_cost = cost of new join order;
            if (cur_cost < old_cost) {
                old_cost = cur_cost) {
                change current join order;
                break;
            }
        }
    }
    for (pos = last; pos > first; pos = pos − 1) {
        for (pos_1 = pos − 1; pos_1 > first;
        pos_1 = pos_1 − 1) {
            move relation as pos_1 to pos;
            cur_cost = cost of new join order;
            if (cur_cost < old_cost) {
                old_cost = cur_cost;
                change current join order;
                break;
            }
        }
    }
}
```

Figure 4A:
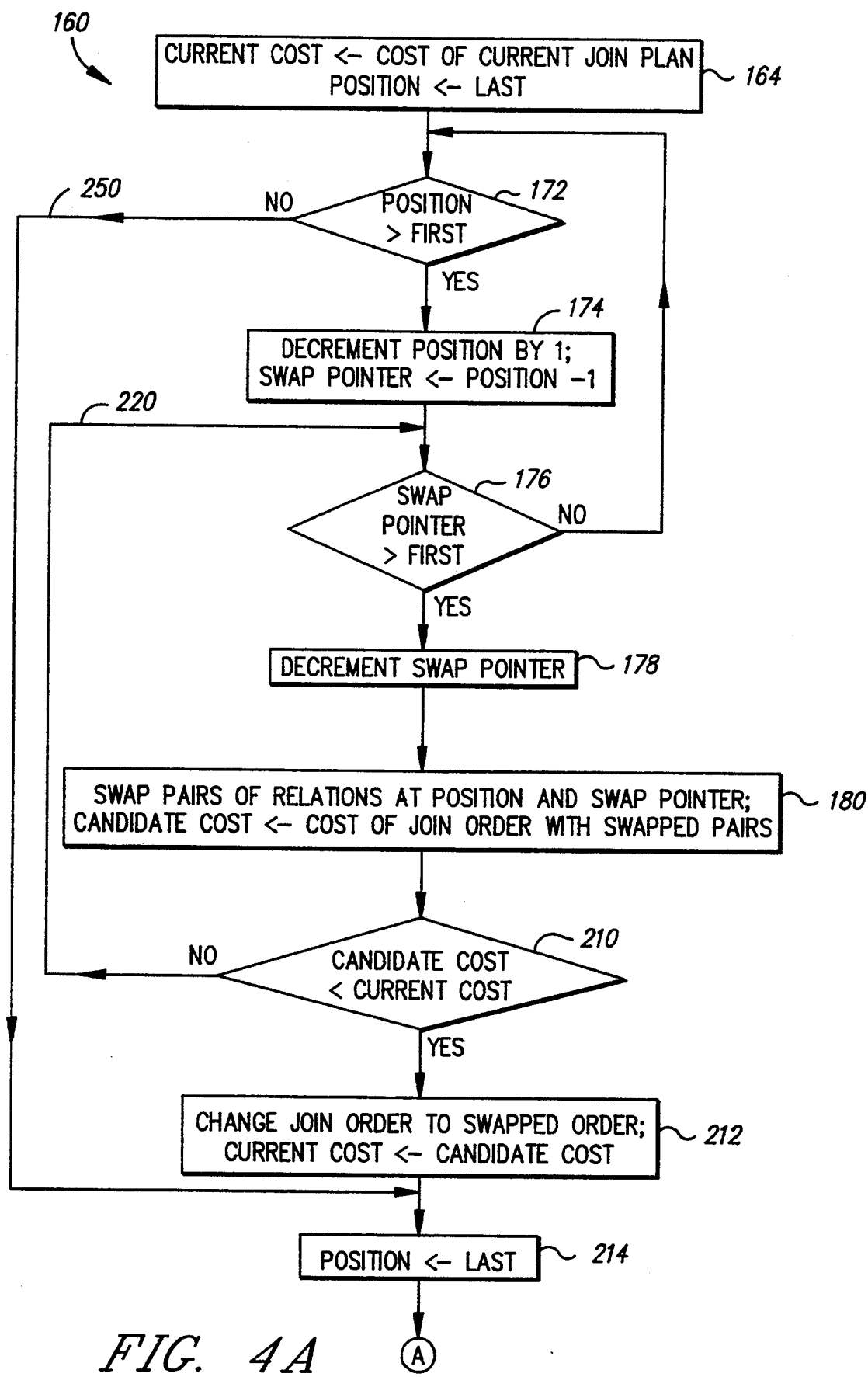
FIGS. 4a and 4b are a flowchart of a postprocessing algorithm for selecting join orders.
Figure 4B:
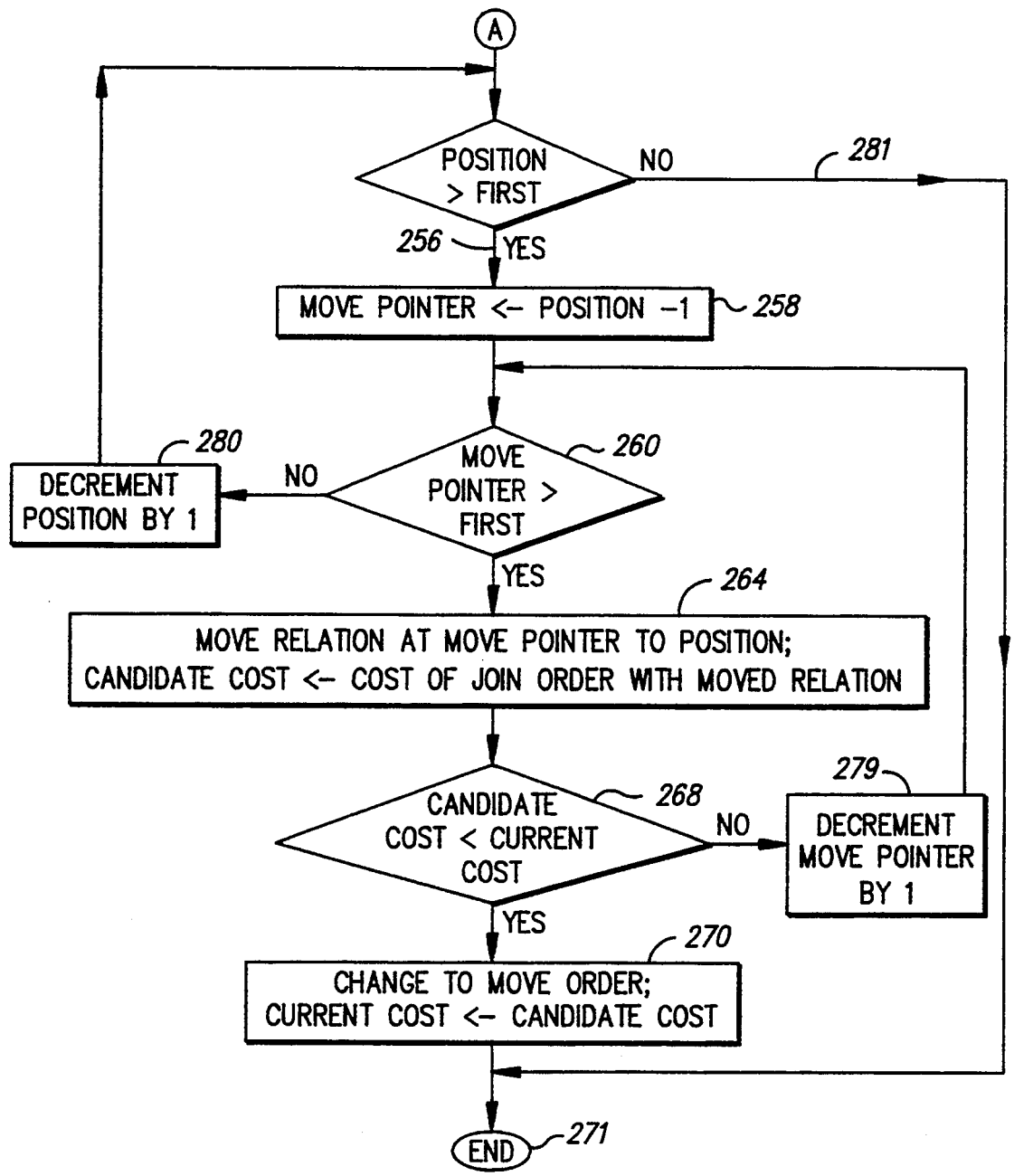

Referring to FIGS. 4a and 4b, a flowchart 160 of the preferred embodiment of a postprocessing method is provided. A variable, current cost, is set to the value of the cost of the join order scheme and join method scheme provided by the foregoing process, and a variable pointer, position, is set to the position of the last relation in the join operation sequence 164. If the position pointer is greater than the position of the first relation in the join order 172, then the first half of the postprocessing step (FIG. 4A) continues and the position pointer is decremented by one. A second variable pointer, swap pointer, is set to the location of the position pointer less one 174. If the swap pointer is greater than the first relation 176, then the swap pointer is decremented one 178. The pairs of relations at position pointer and swap pointer are swapped and the candidate cost is set to be the cost of the join order of swapped pairs 180.

Referring to FIG. 6, the swapping of pairs of relations can be illustrated where the initial join order for the relations is shown as ABCDEFG 190. The position pointer 192 is pointing to relations F and G 194 and the swap pointer 196 is pointed to relations C and D 198. The relation pairs C,D and F,G are swapped to form the candidate join order ABFGECD 200.

Referring again to FIGS. 4a and 4b, the value of the current cost is compared to the value for the candidate cost 210. If the candidate cost value is less than the current cost, then the join order of the candidate sequence of relations (with the swapped pairs) replaces the current join order, the current cost is set to the candidate cost value 212. The position pointer is then set to the last position 214 in preparation for the second half of the postprocessing step.

If the candidate cost is greater than or equal to the current cost, then the process of swapping pairs of relations is repeated and the swap pointer is decremented one position 220, so as to determine whether swapping another pair of relations with the relation pair pointed to by position pointer produces a lower cost join order. This process is repeated until the swap pointer is not greater than the first position of the sequence 221. Thereafter, the position pointer is set to the following relational pair and the process is repeated until the position pointer is not greater than the first position 250 or a lower cost join order is identified 212.

The first half of the postprocessing step FIG. 4a checks whether swapping pairs of relations in the final optimized join order obtained from the prior steps produces a lower cost join order. Once the optimal join order is determined either to still be the join order that was produced prior to the postprocessing step or through the swapping of certain relations, a further step is performed to determine whether moving relations in the series of joins obtains a more optimal solution FIG. 4b.

In the second half of the postprocessing step, the position pointer is reset to point to the last relation 214. If the position pointer is greater than the first position in the sequence 256, then the postprocessing step continues. A move pointer is set to the position of the position pointer less one 258. While the move pointer is greater than the first position in the sequence 260, the relation at the move pointer is moved to the position of the position pointer and the candidate cost is set to the cost of the candidate join order with the moved relation 264. If the candidate cost is less than the current cost 268, then the join orders are changed to the candidate join order produced by the move operation and the current cost is set to candidate cost 270.

Referring to FIG. 7, a schematic illustration is provided for moving relations where the initial relation sequence 270 has the order ABCDEFG. The position pointer 272 is pointing to relation F 274 and the move pointer 276 is pointing to relation D. The relation at the move pointer is moved to the position of the position pointer resulting in the sequence ABCEFDG 278.

Referring again to FIG. 4, the move pointer is iteratively moved to each relation preceding the relation pointed to by the position pointer to test whether moving the relation positioned at the move pointer (by decrementing the move pointer 279) to the location of the position pointer provides a reduced cost for the resulting join order.

After all those relations are tested, the position pointer is moved incrementally closer to the first relation (by decrementing the position pointer 280) and the move pointer again is moved towards the first relation and those relations pointed to by the move pointer are moved to the location of the position pointer, in order to identify a more optimal order for the join operations. This process ends 271 when the position pointer is not greater than the first position 281 or when a lower cost join order is found 270.

For the present algorithm, more than 99% of the solutions found had a cost within 20% of the cost of the Dynamic Programing Algorithm solutions. The average cost of the join order generated by the disclosed algorithm were 1,002 times the dynamic programing solution cost. Hence, the new algorithm is almost as effective as the Dynamic Programing Algorithm at finding the optimal solution and is vastly superior to the Greedy Algorithm.

Experiments have shown that 96% of the solution plans of the present invention produce a cost within 1% of the dynamic programing plans, 98% were within 10% and 99% were within 20%. The two worst solutions had cost ratios of 1.85 and 1.83. The average cost of the join order generated by this algorithm is 1.002 times the Dynamic Programming Algorithm solution plan cost.

Comparing this algorithm to the other polynomial time algorithms, experiments have shown that the present algorithm obtains solutions that are on the order of a magnitude lower in cost on the average. While the solutions obtained by the present algorithm are almost as good as those obtained by the Dynamic Programing Algorithm, the memory usage and running times are orders of magnitude less than for the Dynamic Programing Algorithm. This is true especially when a large number of relations are joined in a query.

For example, for queries with 16 relations, the average and maximum memory used by dynamic programing is 42.6 Mbytes and 177.7 Mbytes, while the corresponding numbers for the present algorithm are 25.6 Kbytes and 56.2 Kbytes. The average and maximum running times of the Dynamic Programing Algorithm are 151.1 seconds and 1491.6 seconds, while for the present algorithm, the average and maximum running times are 19.1 seconds and 23.4 seconds. It is important to note that the difference in resource consumption grows rapidly with increasing number of relations in the query.

Therefore, the present invention overcomes the difficulties of using the Dynamic Programming Algorithm and the Greedy Algorithm and the other polynomial time algorithms by attaining optimal solutions with minimum memory and time complexity.

While the invention has been particularly shown and described with reference to a preferred embodiment thereof, it will be understood by those skilled in the art that various other changes in the form and details may be made therein without departing from the spirit and scope of the invention. Accordingly, the method herein disclosed is to be considered merely as illustrative and the invention is to be limited only as specified in the claims.

We claim:

1. In a relational database computer system including a data processor, a stored database and a plurality of database relations, wherein one or more of said relations are retrieved by the processor by means of query commands performing a plurality of join operations on said relations, a method for optimizing processing of said join operations, comprising the steps of:

(a) assigning a join method at random to each of said join operations to produce a current join method assignment scheme;

(b) identifying an optimal join order for said join operations given said current join method assignment scheme;

(c) assigning a current join order scheme in response to said identified optimal join order;

(d) identifying an optimal join method to be used for each said join operation given said current join order scheme;

(e) assigning said current join method assignment scheme in response to said identified optimal join methods; and (f) repeating steps (b) through (e) until there is no change produced to said current join order scheme and said current join method assignment scheme.

2. The join optimization method of claim 1 wherein the steps of identifying an optimal join order and assigning a current join order scheme are performed using a join order optimization process.

3. The join optimization method of claim 2 wherein said join order optimization process comprises a first part which produces a first join order sequence and a second part which outputs said current join order scheme.

4. The join optimization method of claim 3 wherein said first part of said join order optimization process is preformed using a Krishanmurthy, Boral and Zaniolo (KBZ) Algorithm on said plurality of join operations.

5. The join optimization method of claim 3 wherein said second part of said join optimization process comprises assessing a cost for each of a plurality of alternate permutations for said first join order sequence and assigning the permutation having a lowest cost as the current join order scheme.

6. The join optimization method of claim 5 wherein said permutations are formed by
(a) iteratively swapping relations starting at one end of said first join order sequence with each preceding relation to produce a candidate join order; and
(b) comparing a cost of said candidate join order to a cost of said first join order sequence, wherein when a candidate join order is identified as having a lower cost than said first join order sequence, said second part of said join optimization process ends and said current join order scheme is set to said lower cost candidate join order, otherwise step (a) and step (b) are repeated until the cost for each permutation is compared to the first join order sequence cost, at which point the current join order scheme is set to the first join order sequence.

7. The join optimization method of claim 1 further comprising the steps of repeating steps (a) through (f) a polynomial number of times and identifying the current join order scheme and the current join method assignment scheme having a lowest cost.

8. The join optimization method of claim 7 further comprising the steps of:
forming permutations of said current join order scheme by iteratively swapping pairs of relations starting at one end of said current join order scheme with each preceding pair of relations to produce a candidate join order and comparing a cost of said candidate join order to a cost of said current join order scheme, wherein if the candidate join order is identified as having a lower cost than said current join order scheme, said current join order scheme is set to said lower cost candidate join order, otherwise this step is repeated until the cost for each permutation is compared to the current join order scheme cost and the current join order scheme is unchanged; and
forming permutations of said current join order scheme by starting at one end of said current join order scheme, iteratively moving relations at each preceding relation location to a current location, producing said candidate join order and comparing the cost of said candidate join order to the cost of said current join order scheme, wherein if said candidate join order is identified as having a lower cost than said current join order scheme, said current join order scheme is set to said lower cost candidate join order, otherwise the process continues until the cost for each permutation is compared to the current join order scheme cost and the current join order scheme is unchanged.

9. A computer-implemented join optimization method for optimizing processing of a query for retrieval of data from a relational computer database wherein said database comprises a plurality of relations, and said data retrieval comprises performing a plurality of join operations on a plurality of said relations, said join optimization method comprising the steps of:

(a) randomly assigning a join method to each of said join operations to produce a current join method scheme;

(b) selecting a subset of said join operations to produce a current join order scheme of said join operations;

(c) using a Krishanmurthy, Boral and Zaniolo (KBZ) Algorithm on said current join order scheme to produce a KBZ ordered sequence of join operations;

(d) arranging said KBZ ordered sequence of join operations into said current join order scheme using a cost optimization ordering process;

(e) selecting join methods for each of said join operations in said current join order scheme using a cost optimization join method process to produce said current join method scheme;

(f) calculating a cost value for said current join order scheme said current join method scheme repeating steps (c) through (e) until there is no decrease in the cost value for said current join order scheme and said current join method scheme; and (g) repeating steps (a) through (f) a plurality of times to produce a set of current join order scheme with associated current join method schemes for each order in said set and identifying an optimal join order sequence with associated join methods, wherein said optimal join order sequence is a sequence in said set of current join order having a lowest cost.

10. The join optimization method of claim 9, wherein said cost optimization ordering process comprises the steps of:
(a) determining a cost for said KBZ ordered sequence of join operations;
(b) determining a cost for an alternate permutation of said KBZ ordered sequence of join operations; and
(c) repeating steps (a) and (b) until said cost of a permutation is lower than the cost of said KBZ ordered sequence of join operations, said lower cost permutation being assigned as said current join order scheme, or until all permutations have been assessed.

11. The join optimization method of claim 9, wherein said cost optimization join method process comprises the step of determining a cost for using each of a plurality of join methods with each of said join operations as arranged in said current join order scheme.

12. The join optimization method of claim 9, wherein steps (a) through (f) are repeated at most $R^2$ times where R is the number of said relations.

13. The join optimization method of claim 9, further comprising the steps of:

(h) moving said relations in said optimal join order sequence in a sequential manner to positions of preceding relations to determine whether a lower cost join order sequence can be obtained; and (i) swapping pairs of relations in said optimal join order sequence to determine whether a lower cost optimal join order sequence can be obtained.

14. The join optimization method of claim 9, wherein said join operations are arranged into an acyclic spanning tree using a Greedy Algorithm.

15. A computer-implemented method for optimizing processing of a query to retrieve relations from a relational database wherein said query calls for performing a plurality of join operations on a plurality of said relations, said join optimization method comprising the steps of:

(a) selecting a subset of said join operations to provide a maximum acyclic grouping to form a current join order scheme;

(b) randomly assigning a join method to each of said join operations to form a current join method scheme;

(c) using a Krishanmurthy, Boral and Zaniolo (KBZ) Algorithm on said current join order scheme with said current join method scheme to produce a KBZ ordered sequence of join operations;

(d) determining a cost for said KBZ ordered join sequence;

(e) determining costs for a plurality of alternate permutations of said KBZ ordered join sequence;

(f) repeating step (e) until said cost of a permutation is less than the cost of said KBZ ordered join sequence or all permutations have been tried, and assigning to said current join order scheme said permutation having a lowest cost;

(g) for each of the join operations in said current join order scheme assigning a candidate join method and determining a cost for said join operations with said candidate join method, and assigning the join methods producing a lowest cost for the current join order scheme as said current join method scheme;

(h) repeating steps (c) through (g) until there is no decrease in the cost for the current join order scheme and current join method scheme; and (i) repeating steps (a) through (h) a polynomial number of times to produce a set of current join order scheme and current join method schemes, wherein steps (c) through (g) are repeated $R^2$ times, where R is the number of said relations.

* * * * *

UNITED STATES PATENT AND TRADEMARK OFFICE
CERTIFICATE OF CORRECTION

PATENT NO. : 5,345,585
DATED : September 6, 1994
INVENTOR(S) : B. Iyer et al.

It is certified that error appears in the above-identified patent and that said Letters Patent is hereby corrected as shown below:

In column 16, line 5, 6, delete "the process continues" and insert -- this step is repeated --.

Signed and Sealed this

Seventh Day of November, 1995

Attest:

BRUCE LEHMAN

Attesting Officer

Commissioner of Patents and Trademarks